United States Patent [19]

Lievin

[11] Patent Number: 4,845,599
[45] Date of Patent: Jul. 4, 1989

[54] BICYCLE LAMP DEVICE
[75] Inventor: Robert Lievin, Tourny, France
[73] Assignee: Cipel & Les Piles Wonder, France
[21] Appl. No.: 131,483
[22] Filed: Dec. 10, 1987
[30] Foreign Application Priority Data
Dec. 10, 1986 [FR] France .................. 8617278
[51] Int. Cl.$^4$ .............................................. F21V 33/00
[52] U.S. Cl. ...................................... 362/72; 362/301; 340/432
[58] Field of Search .................. 362/72, 297, 298, 299, 362/307, 301, 341, 347, 350, 343; 340/134

[56] References Cited
U.S. PATENT DOCUMENTS

| 1,262,427 | 4/1918 | Allen | 362/301 |
| 1,642,190 | 9/1927 | Baker | 362/299 |
| 2,694,138 | 11/1954 | Schwinn | 240/7.55 |
| 4,450,513 | 5/1984 | Guggemos | 362/301 |

FOREIGN PATENT DOCUMENTS

| 3134966 | 5/1982 | Fed. Rep. of Germany | 362/72 |
| 664213 | 4/1929 | France | 362/72 |
| 763635 | 2/1934 | France | 362/72 |
| 825868 | 12/1937 | France | 362/72 |
| 1300650 | 6/1962 | France | 362/72 |
| 14040 | 11/1915 | United Kingdom | 362/72 |
| 506414 | of 1939 | United Kingdom | 362/72 |

Primary Examiner—Ira S. Lazarus
Assistant Examiner—D. M. Cox
Attorney, Agent, or Firm—Sughrue, Mion, Zinn, Macpeak & Seas

[57] ABSTRACT

A bicycle lamp device comprises a concave reflector (1), and a light source disposed substantially of the focus of said reflector and constituted by the filament (7) of a bulb (5). Said reflector had at least one window (10) in its surface enabling a secondary beam to be emitted from said source, and the device is characterized by the fact that said reflector further includes at least one secondary mirror (9) fixed to the edge (8) of its inside face, and oriented in such a manner as to send rays from said source through said window (10), thereby increasing the solid angle of said secondary beam.

3 Claims, 1 Drawing Sheet

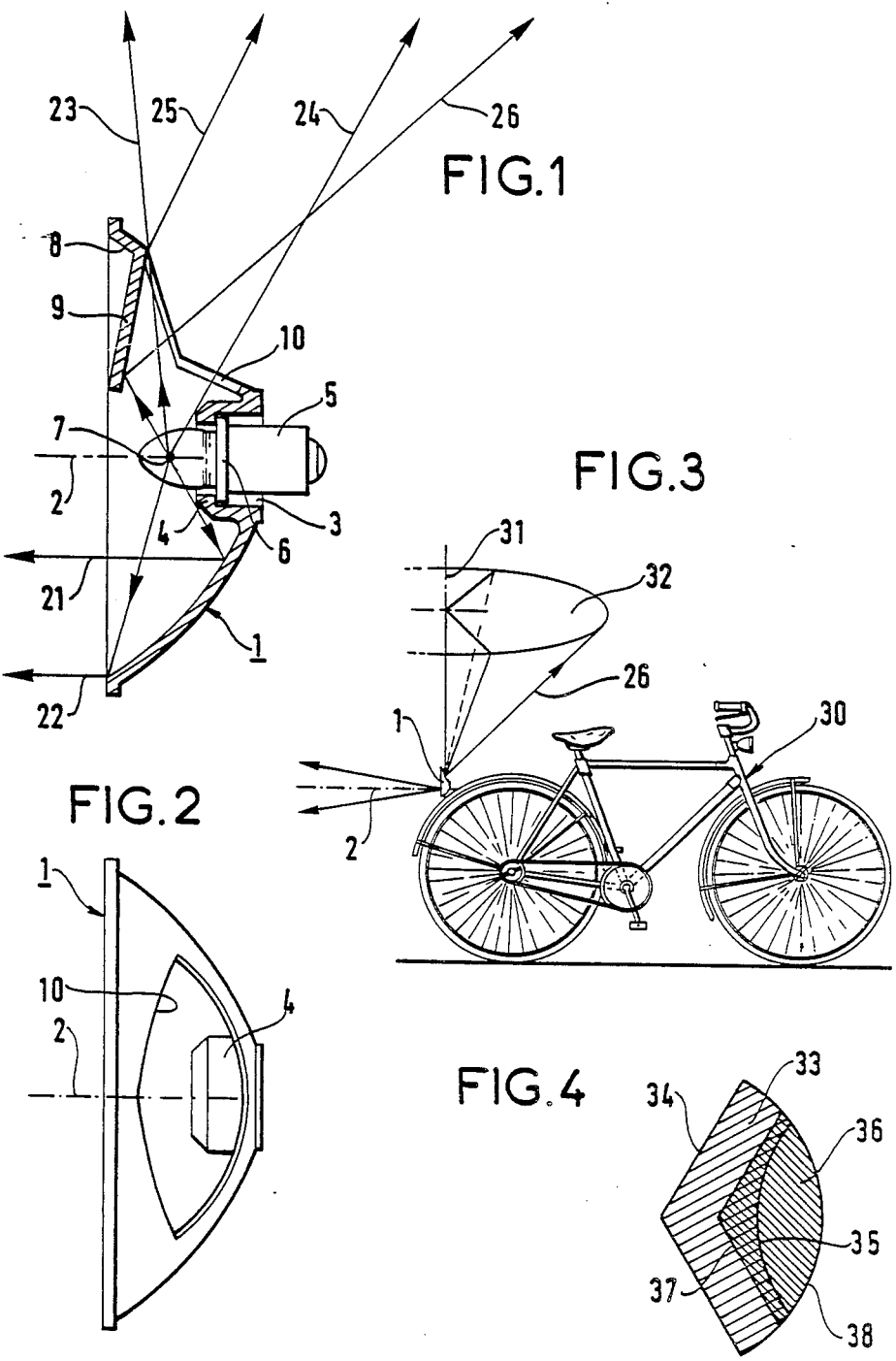

BICYCLE LAMP DEVICE

The present invention relates to a lamp device for a bicycle and intended, in particular, for placing at the back of a bicycle.

BACKGROUND OF THE INVENTION

Such a device is essentially constituted by a concave reflector and a source of light which is generally constituted by the filament of an incandescent bulb which is situated substantially at the focus of the reflector. The center of the reflector has an opening provided with a support for the flange on the bulb. The reflector reflects the light rays it receives from the source into a first approximately parallel and relatively concentrated light beam which is emitted in a substantially horizontal direction; another portion of the light rays leave directly in the form of a spreading conical beam whose axis corresponds to the optical axis of the reflector.

In some applications, a reflector is provided having a window in the top thereof so as to allow a diverging beam coming directly from the filament to pass therethrough in a vertical direction. However, it is observed that the solid angle of this vertical beam is too small since it is partially obstructed by the edge of the bulb support.

Various solutions has been proposed to remedy this drawback.

In American patent U.S. Pat. No. 2,694,138, a second light source is used, thereby increasing the size of the device and its energy consumption.

A mirror is fixed outside the reflector to modify the orientation of the substantially vertical rays leaving the filament directly; this disposition is difficult to mount and the mirror cannot be put into place with sufficient accuracy.

Finally, prisms have been used to deflect the light beam, but as a result a large amount of light is lost by absorption.

It is also observed in the above two solutions that the distribution of light in the deflected beam is not uniform.

The present invention seeks to provide a solution which is simpler and more reliable than prior arrangements.

SUMMARY OF THE INVENTION

The present invention provides a bicycle lamp device comprising a concave reflector, and a light source disposed substantially at the focus of said reflector and constituted by the filament of a bulb, said reflector having at least one window in its surface suitable for emitting a secondary beam from said light source, the device being characterized by the fact that said reflector further includes at least one secondary mirror situated at the end of its inside face, forming an integral part with said reflector, and oriented in such a manner as to direct light rays from said light source through said window, thereby increasing the solid angle of said secondary beam.

A plurality of windows may be provided together with a plurality of secondary mirrors co-operating with respective ones of said windows. The intergal reflector-mirror part is advantageously obtained by molding or by forming.

The reflecting portion of said part is made by polishing or by metallization. The mirrors may be plane, concave, or convex.

BRIEF DESCRIPTION OF THE DRAWINGS

An embodiment of the invention is described by way of example with reference to the accompanying drawing, in which:

FIG. 1 is a diagrammatical cross-section through a device in accordance with the invention, said device including only one secondary mirror;

FIG. 2 is a diagrammatical plan view of the reflector and its opening of the FIG. 1 device;

FIG. 3 is a highly diagrammatical view of a bicycle provided with a device in accordance with the invention; and FIG. 4 is a section view on a horizontal plane through the vertical light beam emitted by the device in accordance with the invention and as shown in FIG. 3.

MORE DETAILED DESCRIPTION

FIG. 1 shows a concave reflector 1 whose optical axis is reference 2 and which has an opening 3 in its center, said opening being provided with a support 4 for a bulb 5. The collar 6 of the bulb 5 is held by the support 4 so that the filament 7 is situated substantially at the focus of the reflector 1. The support 4 has a peg which co-operates with a notch in the flange 6 to ensure that the filament 7 is properly oriented. A window 10 is provided in the top portion of the reflector 1 and is particularly visible in FIG. 2.

The filament 7 thus emits three types of light beam:

a diverging conical beam about the axis 2 comprising all of the rays which do not fall on the reflecting surface of the reflector or on the window;

a beam parallel to the axis 2 after reflection on the reflector 1 (see, for example, emerging rays 21 and 22), with the axis 2 being horizontal in the normal utilization position; and a diverging beam which passes through the window 10 (see, for example, emerging rays 23 and 24) and having a generally vertical average direction.

It may be observed that the solid angle of this vertical beam is limited by the support 4 of the bulb 5 (limiting radius 24). In accordance with the invention, a mirror 9 is provided level with the edge 8 of the reflector 1 and on the inside of the reflector, said mirror 9 being shown as a plane mirror, but it could optionally be convex or concave. This mirror is oriented so that rays coming from the filament 7 leave via the window 10 after reflection thereon, thereby increasing the above-mentioned solid angle (see rays 25 and 26).

The reflector 1 and the mirror 9 are constituted by a single part made by molding or by forming.

The reflecting surfaces of this single part are polished and/or metallized so as to have a reflection coefficient in the range 70% to 100%.

FIG. 3 shows a bicycle 30 fitted with its lamp device whose reflector 1 and horizontally disposed axis 2 are referenced in the figure. The axis 31 represents the vertical direction and the beam 32 is the beam leaving via the window 10. The edge ray 26 of this beam lies at an angle of about 45° with the vertical axis 31.

FIG. 4 is a section through the beam 32 on a horizontal plane. The zone 33 lying between the line 34 and the line 35 corresponds to the beam coming directly from the filament 7 (prior art). The zone 36 lying between the line 37 and the line 38 corresponds to the beam reflected by the mirror 9 and passing through the window 10 in accordance with the invention.

A better distribution of light is thus obtained in a substantially vertical zone.

Naturally, the inclination of this zone relative to the horizontal may be selected according to needs; the positions of the window 10 and the orientation of the mirror 9 may be modified accordingly.

The angle of the extreme ray could be 90°, and it could even be as much as 180°.

A reflector has been described which is provided with a single secondary mirror; however, it could be fitted with a plurality of secondary mirrors each cooperating with a corresponding window as a function of the light distribution selected for the emitted beams.

What is claimed is:

1. A rear facing bicycle lamp device for mounting behind a bicycle rider comprising a concave reflector having an inside reflecting face, and a light source disposed substantially at the focus of said reflector and constituted by a filament of a bulb, wherein said bulb emits a main horizontal axis beam in a horizontal direction away from the bicycle rider, said reflector having at least one window in its reflecting face facing generally vertically upwardly for emitting a secondary beam from said light source, having an axis which is substantially vertically upward, and wherein said reflector further includes at least one secondary mirror situated at the edge of said inside reflecting face, facing said main horizontal beam, forming an integral part with said reflector, and angularly oriented to direct light rays from said light source substantially vertically upward through said window, thereby increasing the solid angle of said secondary beam, to illuminate the silhouette of the bicycle rider for improved visibility to traffic approaching the bicycle from the rear.

2. A lamp device according to claim 1, wherein the secondary mirror is integrally molded with said reflector.

3. A lamp device according to claim 1, wherein the integral part constituting said reflector and said mirror has a reflecting surface as a polished reflecting surface.

* * * * *